June 14, 1955      E. BAAS      2,710,598
SWIVEL CONNECTIONS FOR HYDRAULICALLY
OPERATED TOOLS AND IMPLEMENTS
Filed June 5, 1953      2 Sheets-Sheet 1
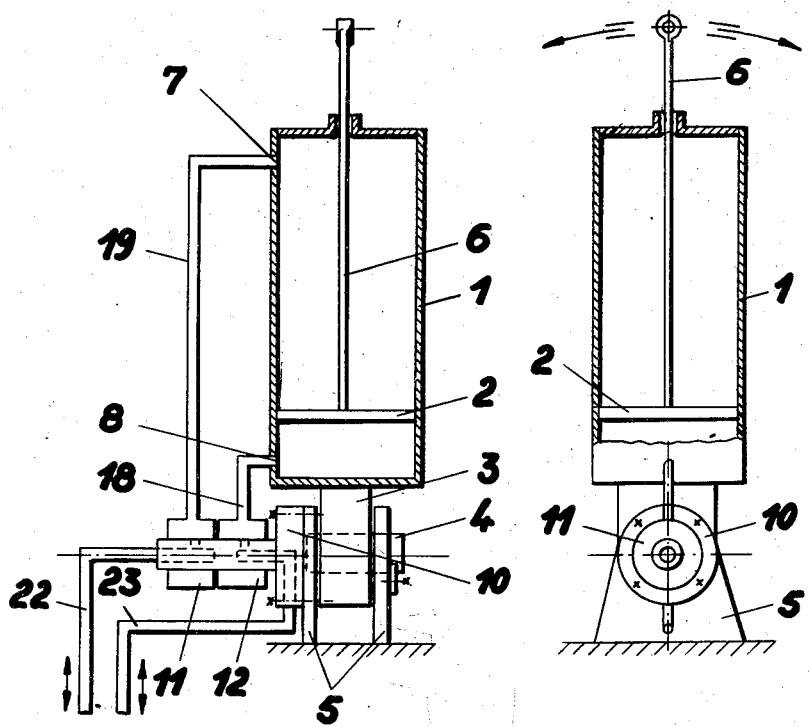
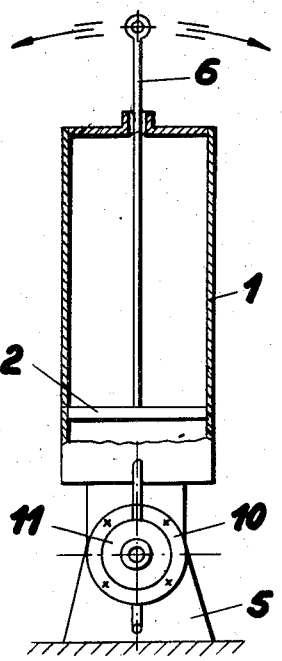
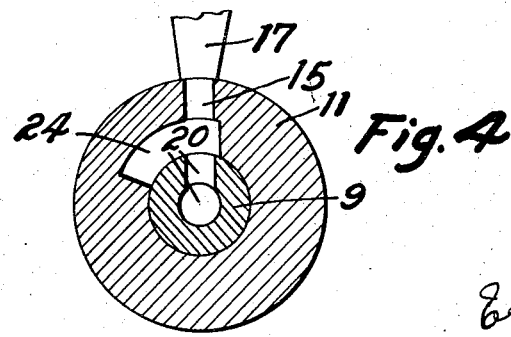

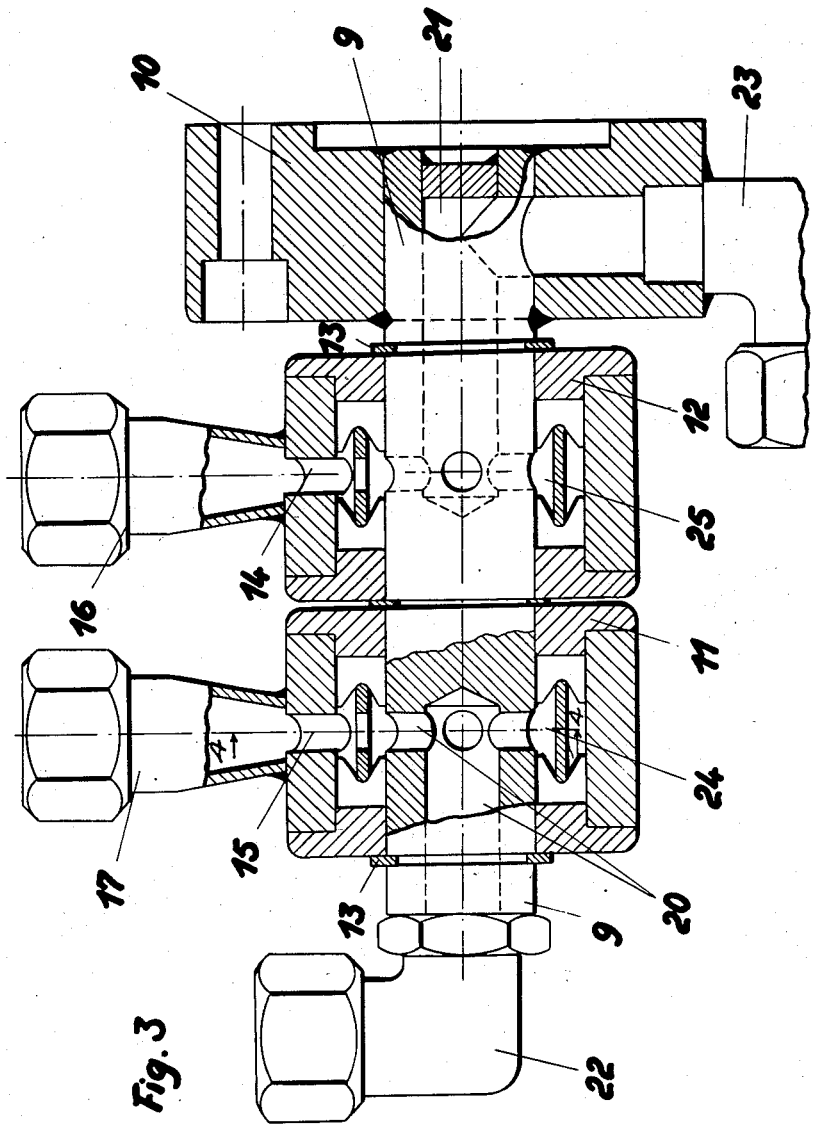

United States Patent Office 2,710,598
Patented June 14, 1955

2,710,598

SWIVEL CONNECTIONS FOR HYDRAULICALLY OPERATED TOOLS AND IMPLEMENTS

Erwin Baas, Hamburg, Germany

Application June 5, 1953, Serial No. 359,910

Claims priority, application Germany January 21, 1953

5 Claims. (Cl. 121—46)

The present invention relates to a hydraulic system to be used for hydraulically operated tools and implements of any kind, particularly, however, on tractors or the like. Various types of hydraulic systems are already known which are in use on tractors or the like, as for instance, for the operation of the tools or implements mounted in a front-end loader. All of these systems have a pivoting hydraulic cylinder, enclosing a single or double acting piston. For the feed and return lines to and from the power cylinder hoses were generally used to convey the hydraulic fluid. These hoses allow for a free swivelling movement of the cylinder around its swivelling axis; however, in the course of time these frequent movements cause bending stresses and torsional strains which in turn cause a steady wear on the hose material. Therefore, said hoses have to be replaced after a certain time of operation, because they blow off. It is another deficiency of the hydraulic systems known so far that the hoses are easily damaged from outside.

To eliminate these disadvantages it has been proposed to utilize the fulcrum pin of the power cylinder as an oil feed in that the inside of said pin is designed to form cavities which are connected with channels situated inside the power cylinder. This design, however, is of disadvantage, as the main bearing or fulcrum pin has to take all force of the cylinder and therefore is subjected to greater abrasion. This increased abrasion leads to an increased wear and thus to a premature leakage of the oil feed and return lines. Furthermore, the cavities and bores weaken the bearing pin which is subjected to a high strain.

The present invention eliminates all disadvantages of the systems known so far by providing a junction point (or oil line joint) for the feed and return lines leading to and from the power cylinder, said junction point being in line with the swivelling axis of the power cylinder and independent from it. It is a particular advantage of this design that the main bearing or fulcrum pin of the power cylinder may be replaced any time and independently from the oil line joint.

In accordance with this invention the oil line joint may be designed for single and double acting pistons. Preferably it is arranged in front of the journal of the power cylinder and is essentially formed by a hollow pin which is, by means of a fixing flange, mounted to the bearing bracket of the power cylinder in line with the swivelling axis of said cylinder. According to the number of the connecting lines to be used one or more oil line joints may be fitted to the pin, said joints being designed to pivot and seal at the same time. The individual joints comprise rings, sleeves or the like and are connected with the oil inlet and outlet of the power cylinder by means of rigid piping. Inside the sleeves are provided with channels, bores or the like which come into connection with separate feed and return channels inside the hollow pin.

It is of particular advantage to design the oil line joint and, respectively, the junction point, as a control means in that the sleeves for the feed and return lines come into connection with the channels inside the hollow pin in a certain position only.

Various alterations in design may be made without departing from the spirit of this invention. One embodiment in accordance with the invention is shown in the accompanying drawings, of which Fig. 1 is a schematic side view of a hydraulic power cylinder, Fig. 2 is a schematic front view of the same cylinder, Fig. 3 is a cross section view through an oil line joint for double acting pistons, and Fig. 4 is a fragmentary section along the lines 4—4 of Fig. 3.

The power cylinder 1 which encloses the piston 2 is provided with a bearing 3 at its lower end, said bearing being pivotally journalled on a fulcrum pin 4 in a bracket 5. The piston rod 6 of the double acting piston extends through the upper cover of the power cylinder 1. Oil feed lines and return lines 7 and 8 for the hydraulic fluid are arranged on both sides of the piston. Normally the power cylinder 1 can pivot around the axis of the fulcrum pin 4, as indicated by the arrows in Fig. 2.

According to the invention the junction point for the oil feed and return lines is exactly in line with the axis of the fulcrum pin 4, as shown in Fig. 1. The oil line joint which forms the junction point essentially comprises a hollow pin 9 which is provided with a fixing flange 10 on one side. Flange 10 has bores for fixing bolts, by means of which said pin is fixed to the side of bracket 5, so that the pin 9 is exactly in line with the fulcrum pin 4.

When working with a double acting piston, sleeves 11 and 12 both slide and seal on the pin 9. By means of locking rings 13 the parts 11 and 12 are secured in their correct position. Each of the sleeves 11 and 12 is provided with a radial bore 14 and, respectively, 15 which are in line with the pipe unions 16 and, respectively, 17. Rigid pipes 18 and 19 lead from the pipe unions 16 and 17 to the oil feed and outlet openings 7 and 8 of the power cylinder 1.

Inside the pin 9 there are bores or cavities 20 and 21 which are in connection with the feed and outlet lines 22 and 23 for the hydraulic fluid. On the other hand the bores 20 and 21 are connected with the inside of the sleeves 11 and 12 by means of radial bores, said sleeves being provided with distributor chambers 24 and 25 which are arranged around the pin 9. It can be clearly seen that the rigid feed and outlet lines 22 and 23 are connected with the rigid pipes 18 and 19, which come from the sleeves 11 and 12, by means of the hollow pin 9 and, respectively, its bores, so that the oil is supplied to or drained off the power cylinder 1 beyond its pivoting point.

If at the same time the oil line joint is to be utilized as a control means, the sleeves 11 and 12 with their inner chambers 24 and 25 may be designed for this purpose, so that the oil lines are connected with each other only in a certain angled position of the joint. On the other hand the oil line joint described herein, may be designed in another form or it may be arranged at some other place, as for instance in line with the axis of any pivot point other than that of the power cylinder. The oil line joint may, for instance, be arranged at the main pivot point of a front-end loader or of any other implement on the tractor. If any more oil lines shall be connected to the oil line joint more than one or two sleeves may be arranged on the same pin. The scope of this invention is not limited to the embodiments shown in the attached drawings.

I claim:

1. In a hydraulic system, a power cylinder, a piston enclosed in said power cylinder, a bearing bracket for said power cylinder, a fulcrum pin arranged in said bracket, feed and return lines for the hydraulic fluid being formed of rigid piping, a junction point for said feed and return lines, inlet and outlet openings on said power cylinder, and connecting sleeves, said junction point being designed as an oil line joint being formed by a hollow pin having a fixing flange and being mounted to said bearing bracket by means of said fixing flange, the axis of said hollow pin being in line with said fulcrum pin, and said connecting sleeves being pivotally arranged on said pin and connected with said inlet and outlet openings on said power cylinder by means of said rigid piping.

2. The hydraulic system as set forth in claim 1, in which said hollow pin is provided with different channels for the connection of several feed and return lines, and several of said sleeves being pivotally arranged on said hollow pin, each of said sleeves being provided for one of said feed and return lines.

3. The hydraulic system, as set forth in claim 1, in which said hollow pin and said fixing flange are provided with channels and fixedly mounted feed and return lines for the hydraulic fluid, said feed and return lines being in connection wtih said channels inside said hollow pin.

4. The hydraulic system, as set forth in claim 1, in which more than one sleeve is arranged on the same hollow pin.

5. The hydraulic system, as set forth in claim 1, in which said junction point is designed as an oil line joint and act as a control means in that said channels in said sleeves are connected with said channels in said hollow pin in a position of predetermined angular range only.

References Cited in the file of this patent

UNITED STATES PATENTS

| | | |
|---|---|---|
| 1,394,245 | Berry | Oct. 18, 1921 |
| 2,322,440 | Highberg | June 22, 1943 |
| 2,382,457 | Wertman | Aug. 14, 1945 |
| 2,466,352 | Armington | Apr. 5, 1949 |